US006659339B2

(12) United States Patent
Konishi

(10) Patent No.: US 6,659,339 B2
(45) Date of Patent: Dec. 9, 2003

(54) WORKING CABINET FOR BARBER AND BEAUTY SHOPS

(75) Inventor: Kuniyoshi Konishi, Tokyo (JP)

(73) Assignee: QB. Net Co., Ltd., Tokyo (JP)

( * ) Notice: Subject to any disclaimer, the term of this patent is extended or adjusted under 35 U.S.C. 154(b) by 63 days.

(21) Appl. No.: 09/865,675

(22) Filed: May 29, 2001

(65) Prior Publication Data

US 2002/0084731 A1 Jul. 4, 2002

(30) Foreign Application Priority Data

Dec. 28, 2000 (JP) ....................................... 2000-403169

(51) Int. Cl.[7] ................................................ G06F 17/00

(52) U.S. Cl. ......................... 235/375; 235/380; 902/30; 312/209; 705/7

(58) Field of Search ................................ 235/435, 439, 235/441, 449; 902/4, 22, 30, 35, 37, 40, 41; 312/235.5, 209, 224; 705/7, 1, 16, 17, 18, 21, 11; 297/182; 52/28, 36.1; 235/375, 380, 376

(56) References Cited

U.S. PATENT DOCUMENTS 3,994,528 A * 11/1976 Humphrey .................. 297/182
4,136,907 A * 1/1979 Hermanns ................... 297/182
4,177,612 A * 12/1979 Tochihara ...................... 52/28
4,290,659 A * 9/1981 Yoshiyuki ................... 312/224
4,310,885 A * 1/1982 Azcua et al. ................. 705/16
4,840,000 A * 6/1989 Grines ........................ 52/36.1
5,967,632 A * 10/1999 Lamia ........................ 312/209
6,032,859 A * 3/2000 Muehlberger et al. ...... 235/449
2002/0046070 A1 * 4/2002 Konishi ......................... 705/7

FOREIGN PATENT DOCUMENTS

FR 2 747 294 A1 * 10/1997
JP 2-234707 A * 9/1990
JP 9-125721 A * 5/1997
JP 9-323491 A * 12/1997

* cited by examiner

*Primary Examiner*—Jared J. Fureman
(74) *Attorney, Agent, or Firm*—Sughrue Mion, PLLC

(57) ABSTRACT

A modular haircut working section arrangement allowing adjacent customers to have a haircut without facing each other, and assuring an effective and safe haircut in a relatively small space. The working section has (1) a working cabinet, comprising a front cabinet to which a chair is opposed and being provided with a mirror, a storage section and a card holder, and (2) a side cabinet where an information input terminal device, including a card reader for making the customer and staff information electronic, is provided. A dust box having an opening and shutting plate is also provided with an opening/closing switch for detection is arranged under the haircut chair. A controller connects the information input terminals of a plurality of working sections.

6 Claims, 11 Drawing Sheets

WORKING CABINET FOR BARBER AND BEAUTY SHOPS

BACKGROUND OF THE INVENTION

1. Field of the Invention

The present invention relates to a working cabinet for barber or beauty shops installed in a way to improve the efficiency of work environment.

2. Related Art Statement

The work place of conventional barber and beauty shops is formed by disposing vertically a mirror and a shampoo stand along the building wall surface, providing a storage cabinet along the wall surface under or on the right or left of the shampoo stand, and installing a haircut chair in opposition to the mirror. In addition, some are formed by disposing a mirror on the wall surface, while the shampoo stand and the storage cabinet are disposed aslant beside the mirror, and the haircut chair rotates by a certain angle (30 degrees or the like) to face to respective ones. Further, still some are formed, as proposed by the present inventor, by installing a mirror wall aslant to the wall surface, a haircut chair aslant to the wall surface in opposition to the mirror wall, and disposing a side wall counter-slantwise beside the chair.

It is desirable to improve the aforementioned first installation mode along the wall surface, because customers sitting in haircut chairs juxtaposed in one row laterally face each other uncomfortably as they look aside, and it is necessary to secure a large lateral space in order to prevent adjacent workers from interfering. In the aforementioned second installation mode, though the facing state can be improved, an occupation space for slant projection of the shampoo stand and storage cabinet is required, and a large lateral space is still required for preventing workers from interfering.

Being arranged aslant and counter-slantwise, the third installation mode can resolve the aforementioned problems; however, it is desirable to concretize an efficient unit composition.

SUMMARY OF THE INVENTION

The present invention is devised in view of such conventional problems and has an object to provide, by making a unit, an installation allowing an effective haircut, allowing adjacent customers to have a haircut without facing each other, and assuring an effective and safe haircut in a relatively small space.

In order to achieve the aforementioned object, the present invention is characterized by having composed a working cabinet for barber and beauty shops by continuously installing, with a certain angle, a front cabinet and a side cabinet as a pair, providing a mirror on the face of the front cabinet, and disposing an information input terminal device on either cabinet section.

It is also characterized by that the working cabinet for barber and beauty shops is composed by arranging continuously a plurality of front cabinets and side cabinets by pair of the two having an angle each other, providing a mirror on the face of each front cabinet, and disposing respectively an information input terminal device on each pair of cabinet sections.

Further, it is also characterized by that the working cabinet for barber and beauty shops is composed by disposing an information input terminal device on either cabinet of a front cabinet on which a mirror is fitted in opposition to the haircut chair, or a cabinet having a storage section and being placed beside or behind the haircut chair.

DETAILED DESCRIPTION OF THE INVENTION

Figure 1:
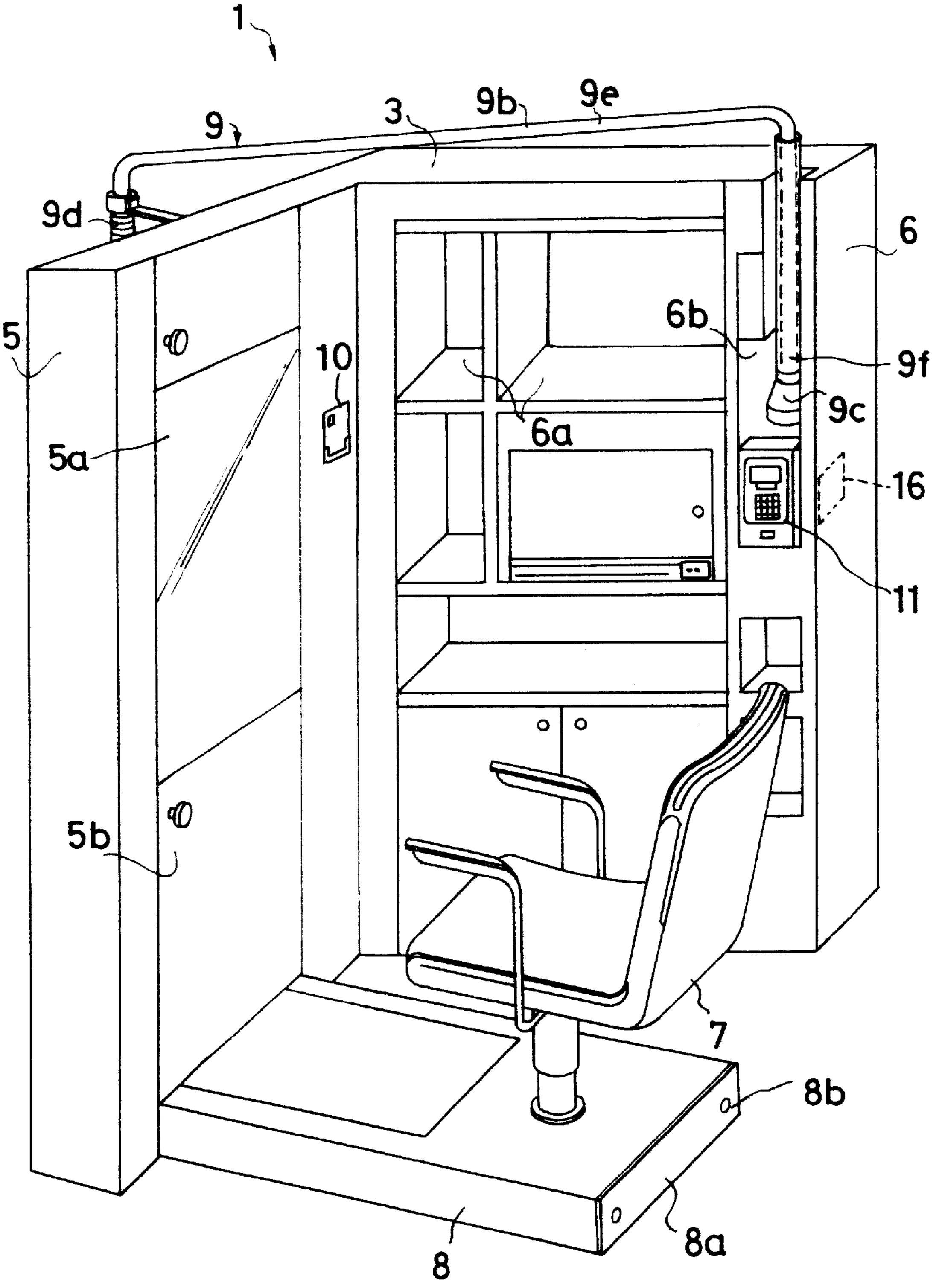
FIG. 1 is an outline perspective view of a working cabinet according to the present invention.
Figure 2:
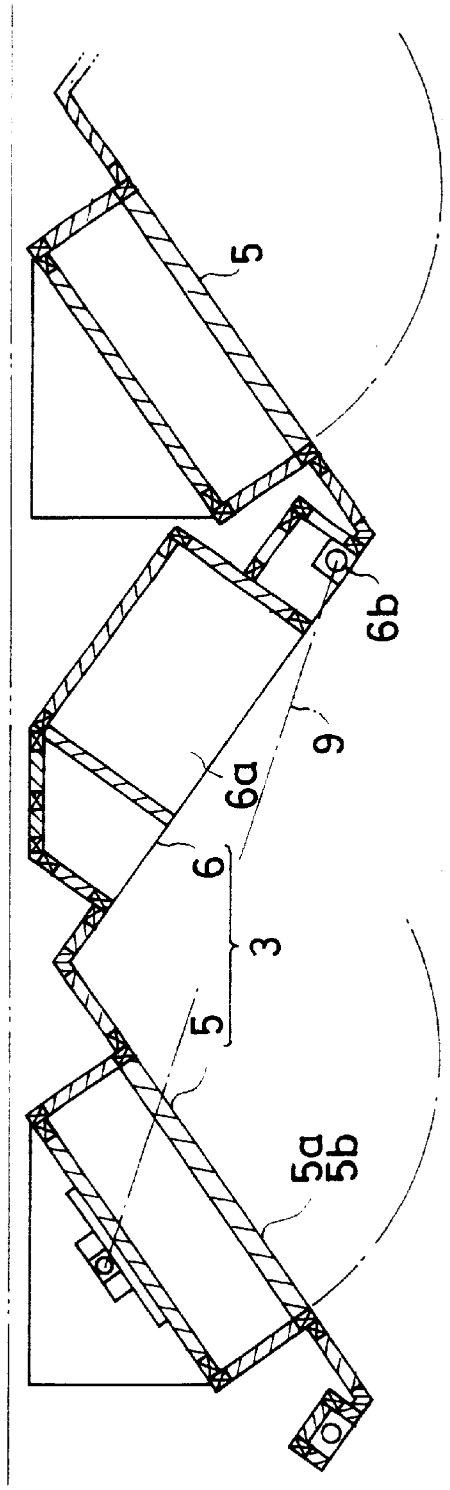
FIG. 2 is a plan schematic view showing the arrangement state of the working cabinet of FIG. 1.

Now, a preferred embodiment of a working cabinet for barber and beauty shops according to the present invention will be described referring to the drawings.

A shop is divided into a plurality of working sections 1 and one reception section 2, a working cabinet 3 is installed in respective working sections 1, and a reception cabinet 4 is installed in the reception section 2.

In the working cabinet 3, a front cabinet 5 and a side cabinet 6 are arranged so as to cross each other making an interior angle of 90 to 120 degrees approximately, or most preferably, making an interior angle of around 110 degrees, a haircut chair 7 surrounded by the working cabinet is placed opposite to this front cabinet 5, the side cabinet 6 being positioned beside, and a dust box 8 is arranged under the haircut chair 7.

In the work section 1, a plurality of working cabinet 3 are arranged crossing continuously, by installing continuously a side cabinet released side end of another working cabinet 3 at a front cabinet released side end of one working cabinet 3, this front cabinet and the side cabinet are arranged crossing each other so that their angle will also be an outer angle of 90 to 120 degrees approximately, or most preferably, an outer angle of around 110 degrees, and in this situation, a plurality of haircut chairs 7 are arranged in parallel slantwise, opposing to respective front cabinet 5.

Figure 3:
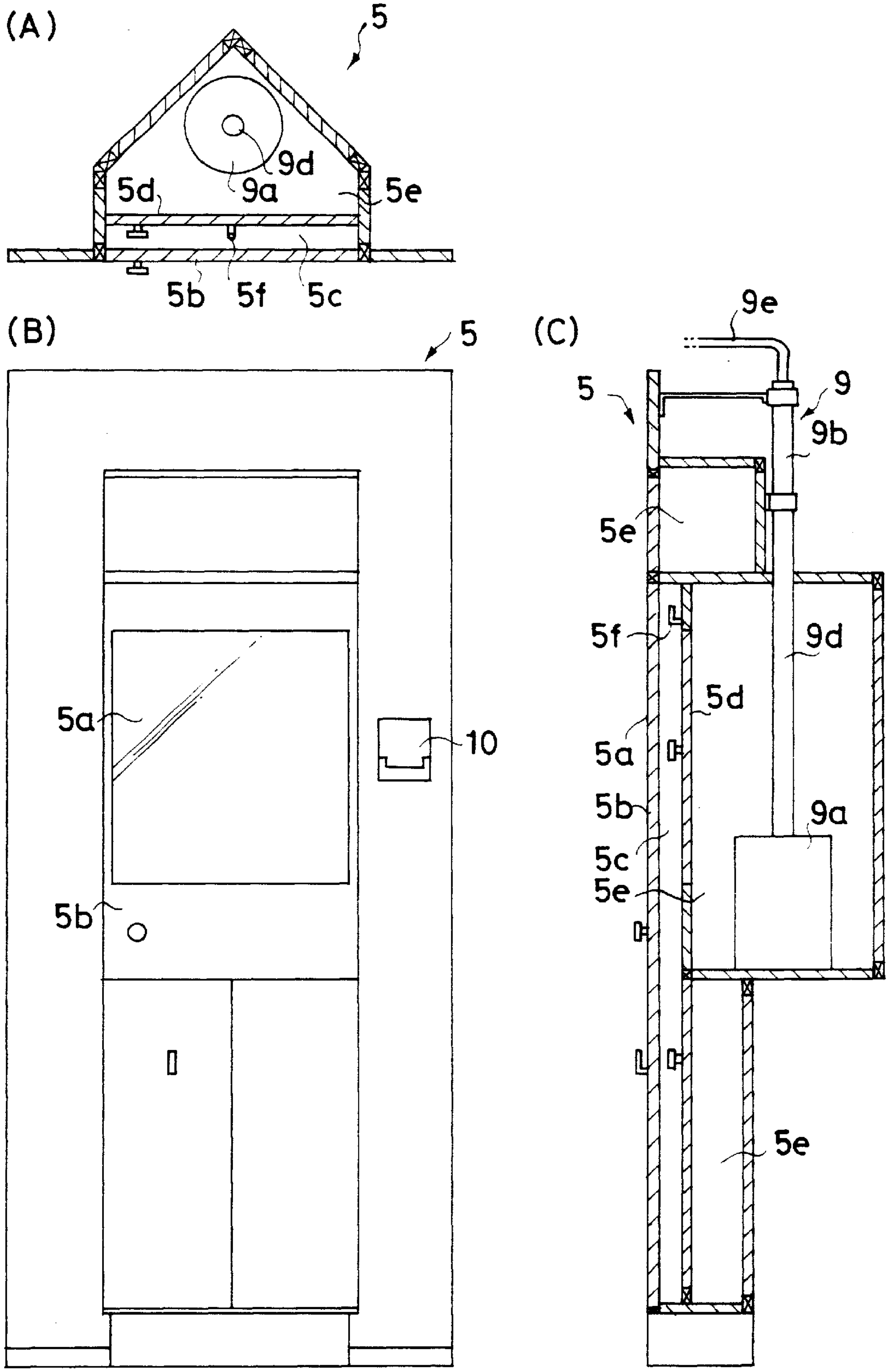
FIG. 3 shows the outline of a front cabinet of the working cabinet, (A) is a front cross section, (B) is a front view, and (C) is a front longitudinal section.

The front cabinet 5 is, as shown also in FIG. 3, provided with an outer door **5*b* wherein a large mirror 5*a* is attached to the upper portion thereof, an inner door 5*d* is provided (provided in upper and lower two stages in the drawing) leaving an aperture 5*c* inside the outer door 5*b* where clothes or others can be hung, a storage section 5***e* is disposed in the inner door 5*d*, a suction pump 9*a* of an air cleaning device 9 is arranged in this storage section (upper storage section in the drawing), a hook 5*f* is attached to an outer face of the inner door 5*d*, and a contact section with the dust box 8 is formed at the lower end of the front cabinet 5.

A card holder 10 is attached to the facade aside of the front cabinet 5. This card holder may be attached to the front of the side cabinet 6.

Note that both outer door and inner door may arbitrarily be designed to divide into a convenient number.

Figure 4:
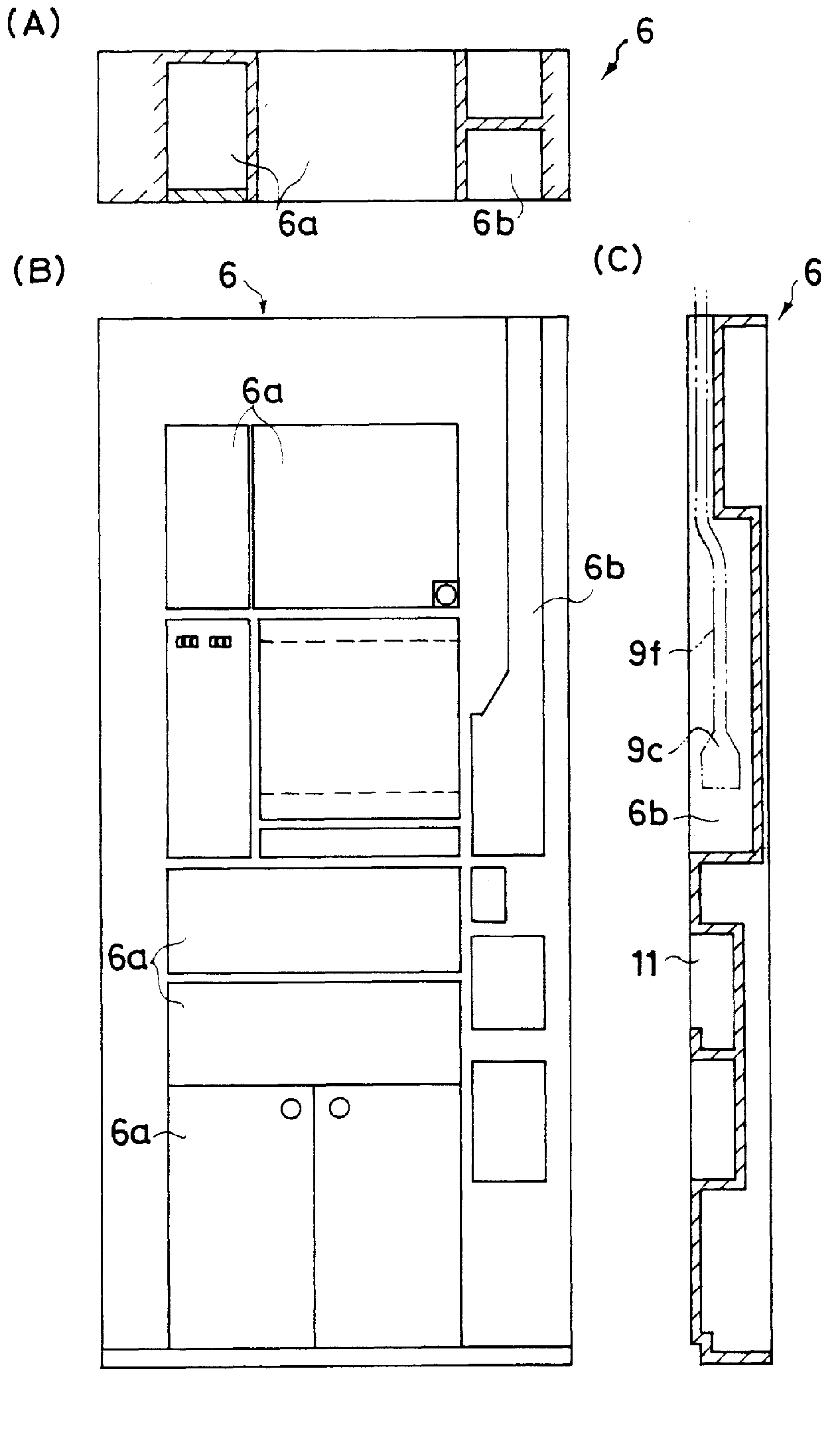
FIG. 4 shows the outline of a side cabinet of the working cabinet, (A) is a front cross section, (B) is a front view, and (C) is a front longitudinal section.

In the side cabinet 6, as shown also in FIG. 4, a storage shelf 6*a* having the cabinet front as taking in and out face is provided, the information input terminal device 11 is installed on the front of the storage shelf 6*a*, a storage cavity 6*b* for storing a hanging portion 9*f* of an air hose 9*b* is formed in an area near the side end of the side cabinet behind the haircut chair 7 up to the upper end, and a breaker 16 of an air cleaning device 9 is fitted to the cabinet face.

The dust box 8 shall, as shown in FIG. 1, be a flat hollow box, open at the plate portion of an arbitrary side, or preferably, at the side end plate portion behind the haircut chair 7, an opening and shutting plate 8*a* is fitted to this opening portion, and by opening this opening and shutting plate 8*a*, cut hair, dust or the like can be collected and stored in the dust box. In addition, an opening and closing switch 8*b* detecting the open and closed state of the opening and shutting plate 8*a* is attached to opening and shutting plate 8*a* or the opening portion of the dust box.

The opening portions side at the dust box bottom has an end portion form with small difference in level to facilitate to sweep therein. The dust box is made separable from the working cabinet 3, and the stored dust or the like can be thrown away by the opening the opening and shutting plate 8*a* or an opening and closing aperture provided on another side plate portion.

Here, a dust box insertion section allowing to slide out and in the dust box 8 in front outside direction may be formed at the lower end portion of the front cabinet 5.

The air cleaning device 9 includes, as shown in FIGS. 1 to 4, a suction pump 9*a* installed in the storage section 5*e*, an air hose 9*b* and a suction inlet 9*c* fitted to its tip, and the air hose 9*b* is formed including a rising section 9*d* from the suction pump 9*a* to over the front cabinet 5, a hard pipe section 9*e* supporting its upper end portion rotatably, extending horizontally up to the proximity of the side end portion of the side cabinet 6, and circularly rotatable taking the aforementioned support section as rotation axis, and a hanging section 9*f* of a flexible hose hanging from the hard pipe section's extremity.

The hanging section 9*f* provided with the suction inlet 9*c* of the air hose 9*b* stored in the storing cavity 6*b* of the side cabinet 6 can be extracted from the cavity and rotatable in the horizontal direction, and cut hair can be sucked, by applying the suction inlet 9*c* to the customer's hair.

Here, the air cleaning device 9, including the suction pump 9*a*, may be arranged behind the side cabinet 6.

Figure 5:
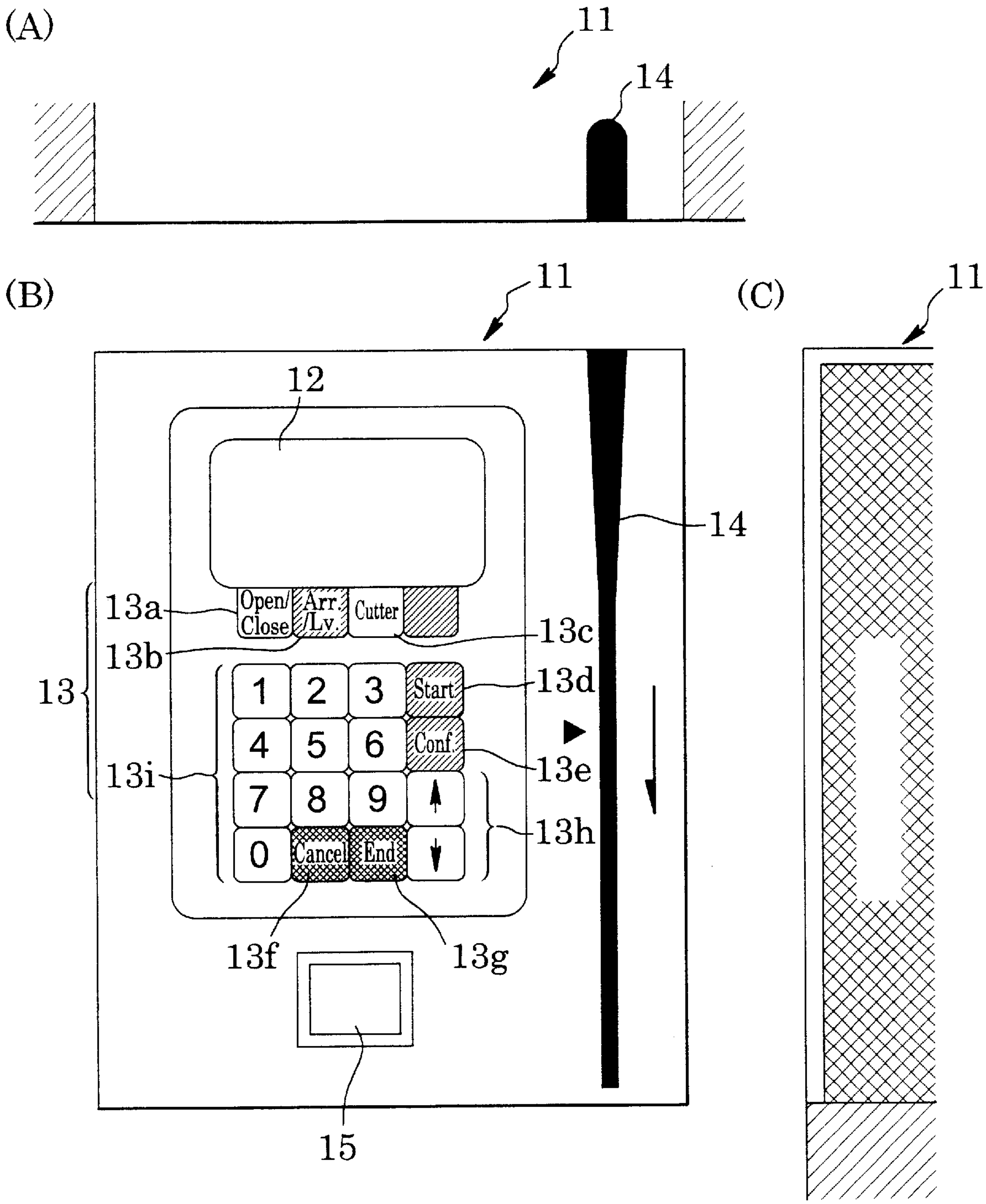
FIG. 5 shows the outline of information input terminal device, (A) is a plan outline view, (B) is a front view, and (C) is a side outline view.

The information input terminal device 11, as shown in FIG. 5, is provided with a display 12, operating keys 13, a card reader 14, and an air cleaning switch 15.

The operating keys 13 are composed of a shop opening/closing key 13*a*, arrival/leaving key 13*b*, haircutter key 13*c*, start-a-haircut key 13*d*, confirmation key 13*e*, cancellation key 13*f*, end-a-haircut key 13*g*, scroll key 13*h*, numeric keys 13*i* or the like.

The air cleaning switch 15 is a switch for operating the suction pump 9*a* of the air cleaning device.

Figure 6:
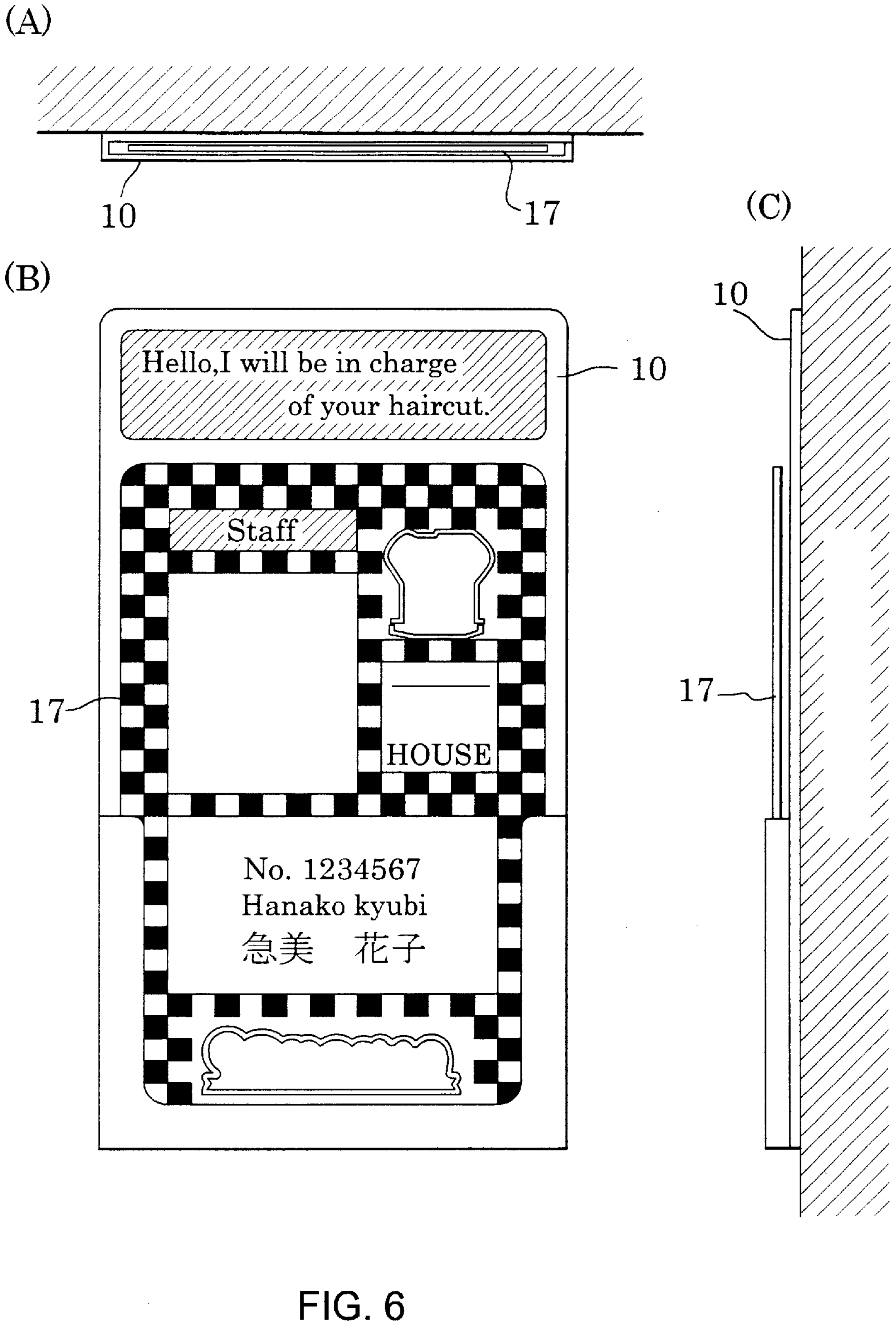
FIG. 6 shows the outline of a card holder, (A) is a plan outline view, (B) is a front view, and (C) is a side outline view.

The card holder 10, as shown in FIG. 6, receives and holds a staff ID card 17.

Here, the staff ID card 17 has the staff face picture, number, name and the like printed thereon, and also the personal information concerning the staff is recorded therein.

Figure 7:
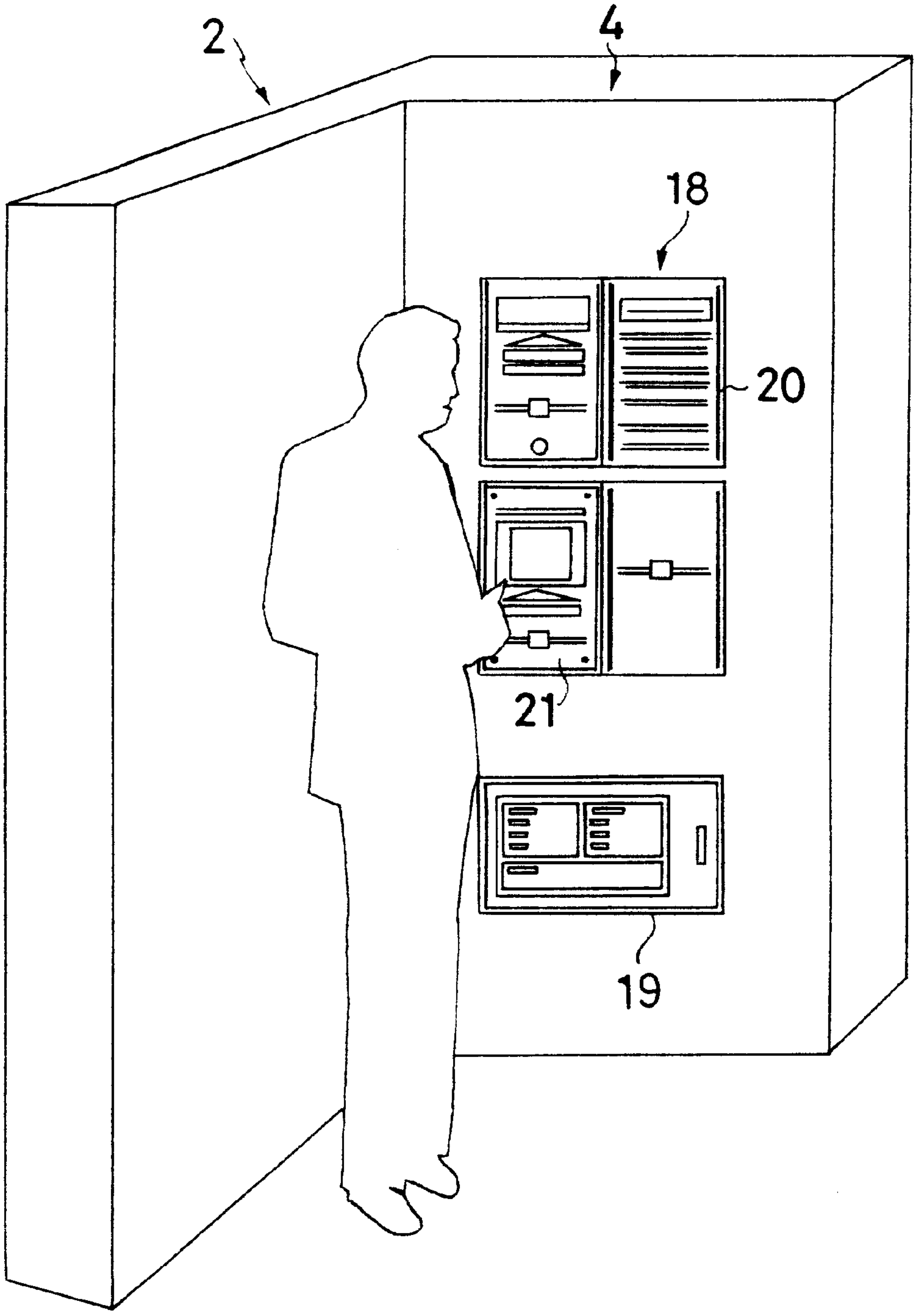
FIG. 7 is a schematic perspective view of a reception cabinet.

The reception cabinet 11 is, as shown in FIG. 7, provided with a ticket vendor 18 and a controller 19 on the front section.

Figure 8:
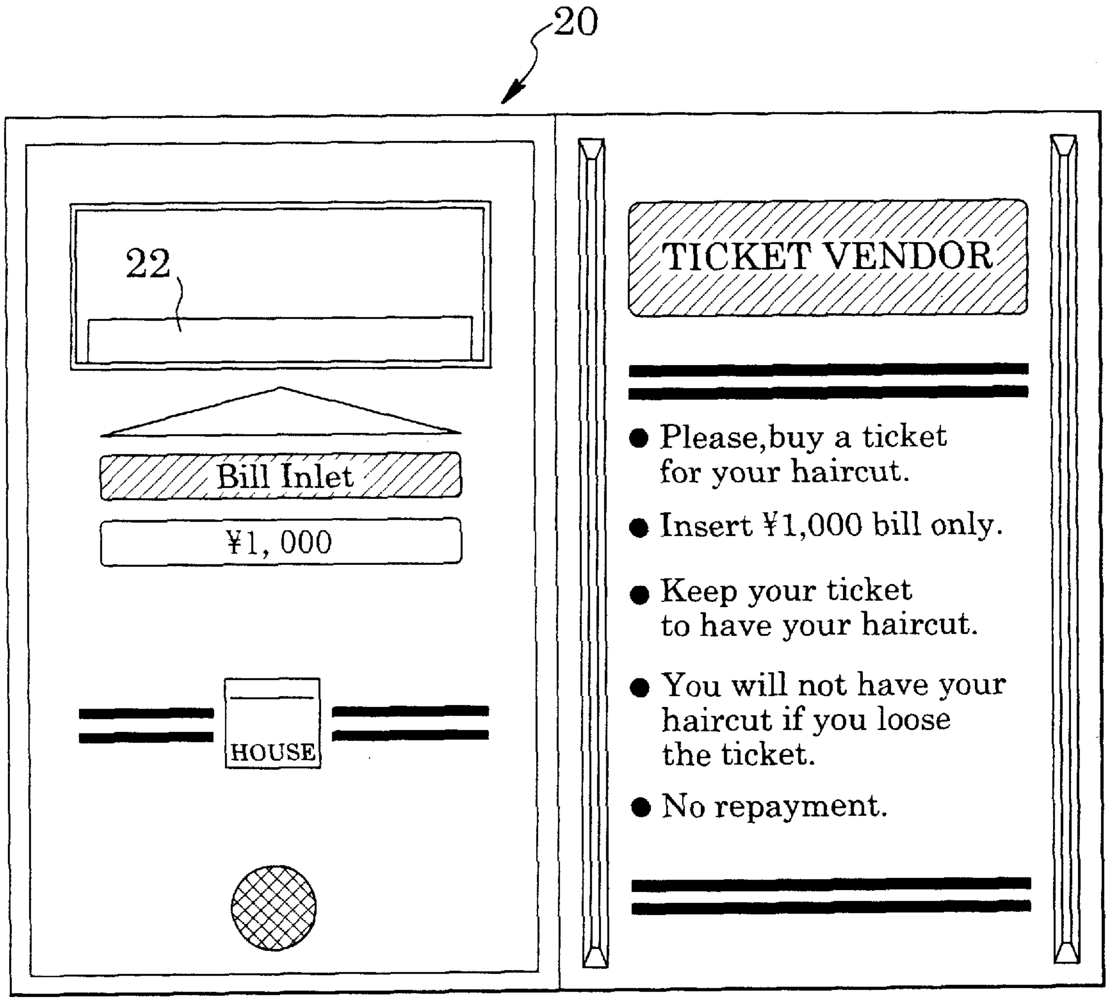
FIG. 8 is a front view of a payment machine of a ticket vendor.
Figure 9:
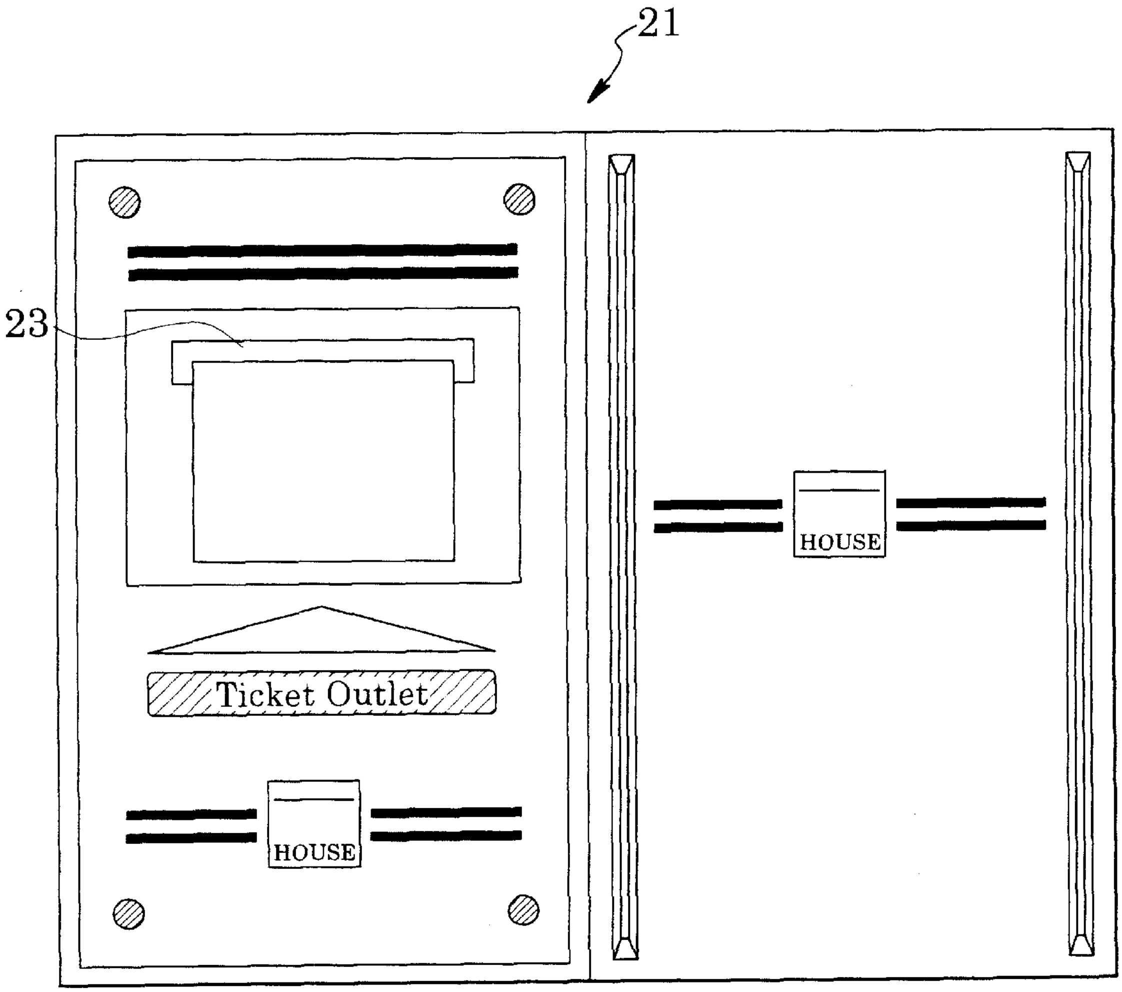
FIG. 9 is a front view of a printer of the ticket vendor.

The ticket vendor 18 is composed of a payment machine 20 and a printer 21, and as shown in FIG. 8, a bill inlet 22 is formed on the payment machine 20, and as shown in FIG. 9, a ticket outlet 23 is formed on the printer 21.

Figure 10:
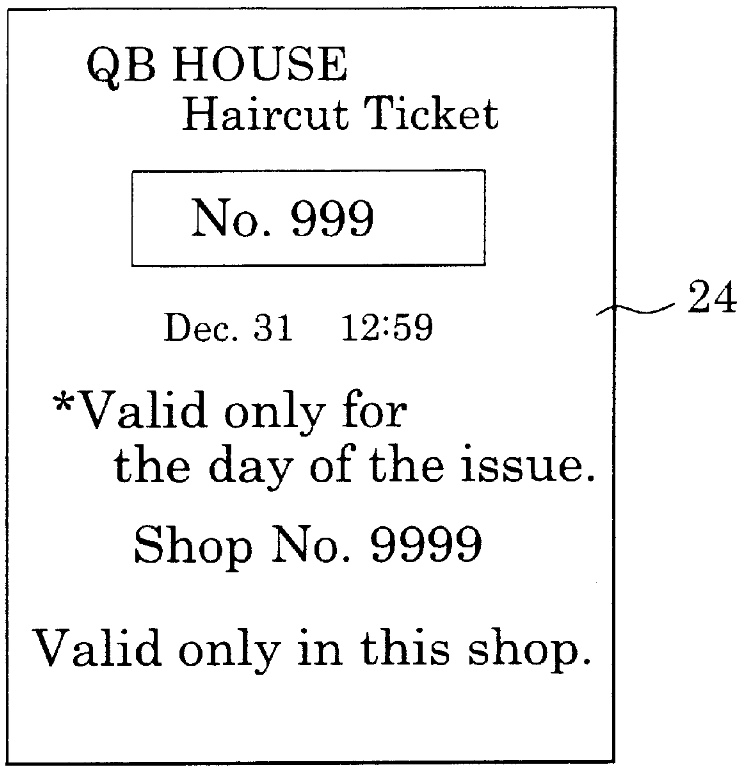
FIG. 10 is a front view of a haircut ticket.
Figure 11:
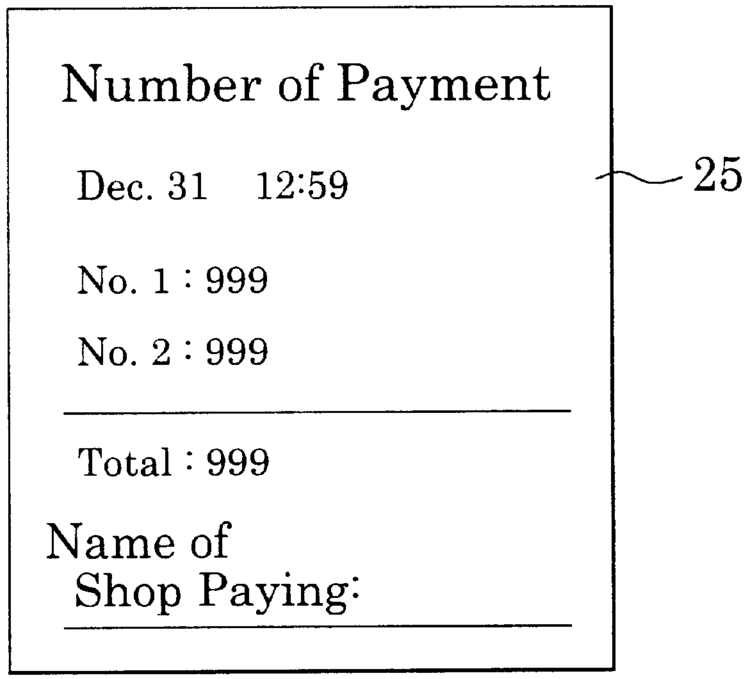
FIG. 11 is a front view of a cash deposit number indication sheet.

There, when a fixed bill is inserted into the bill inlet 22, a ticket 24 as shown in FIG. 10 is printed and discharged from the ticket outlet 23. In addition, a deposit number indication sheet 25 as shown in FIG. 11 can also be discharged.

Figure 12:
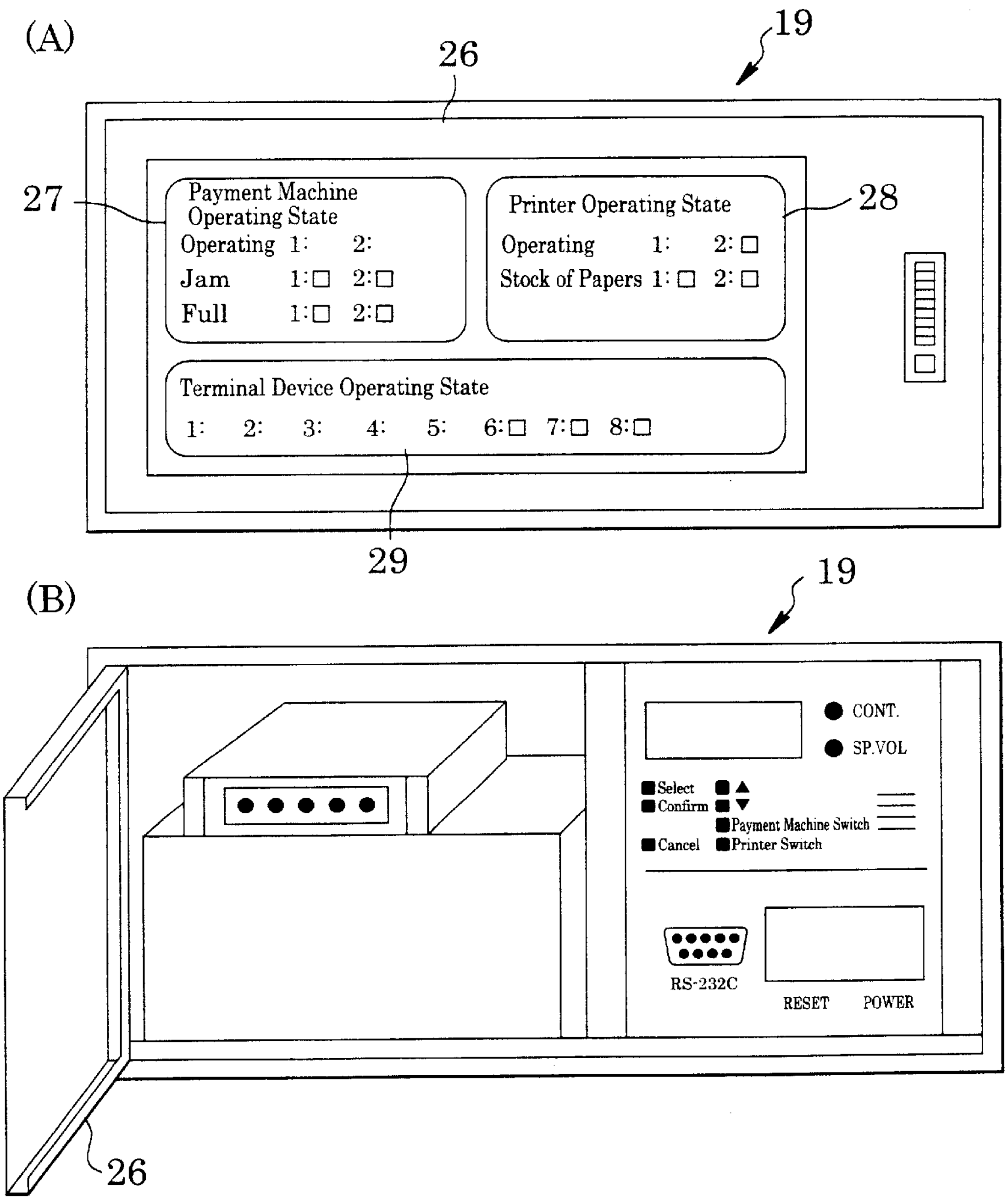
FIG. 12 shows a controller, (A) is a front view, and (B) is an inside front view.

The controller 19, as shown in FIG. 12, has a payment operating state display part 27, a printer operating state display part 28 and an information input terminal device operating display part 29 formed on a display panel 26, allowing to confirm if they are in operation or not.

Moreover, the controller 19 has a function to control various equipment as well as to process and memorize various information.

Besides, it is preferable to install a signal device which is lighted in a plurality of colors outside the entrance of the shop, allowing recognizing by sight the congestion state in the shop, by means of the signal device.

Barber or beauty shops provided with the aforementioned composition can be applied not only for computer assisted shop management, but also for multiple shop management. For instance, by providing a business consignment organ with a Web server device and a data base server device, various information received from each shop can be processed and memorized, as well as various information can be transmitted or received among a management head office, financial institutions, owners, staffs or others.

Between each shop and the financial institutions, it is preferable to connect via an exclusive line, and among the management head office, the owners and the staffs, it is preferable to connect via Internet.

In other words, it is so composed to install a plurality of client devices in the management head office to transmit or receive various information between said Web server device or data base server device by them, and to allow the owners and the staffs to receive various information from the said Web server device and the said data base server device by a convenient client device they possess themselves.

Next, the function of the aforementioned network system including the present invention will be described as follows.

The first staff arrived at the shop performs the shop opening process conveniently by means of the information input terminal device 11 of the working cabinet 3.

The shop opening/closing key 13*a* of the information input terminal device 11 is depressed to display characters "Open" on the display 12. Next, numeric keys 13*i* are depressed to input the weather condition at the moment of shop opening. "0" is for fine, "1" for cloudy, "2" for rain, "3" for snow, and so on.

When the confirmation key 13*e* is depressed, the shop opening data is transferred to the controller 19 and the signal device outside the shop will light on in green.

The last staff leaving the shop performs the shop closing process conveniently by means of the information input terminal device 11 of the working cabinet 3.

The shop opening/closing key 13*a* of the information input terminal device 11 is depressed, to display characters "Closed" on the display 12. Next, numeric keys 13*i* are depressed to input the weather condition at the moment of shop closing as mentioned above.

When the confirmation key 13*e* is depressed, the shop closing data is transferred to the controller 19 and the signal device will light on in red. Moreover, the printer 21 discharges the cash deposit number indication sheet 25 of the day.

The staff, when arrive at the shop, performs conveniently the shop arrival process by means of the information input terminal device 11 of the working cabinet 3.

The staff arrival/leaving key 13*b* of the information input terminal device 11 is depressed to display characters "attendance" on the display 12. Next, if the staff ID card 17 is introduced into the card reader 14, the staff ID cord is indicated on the display 12, and staff-arrival data is transferred to the controller 19.

The shop leaving process is similar. The staff arrival/leaving key 13*b* of the information input terminal device 11 is depressed to display characters "leaving" on the display 12. Next, if the staff ID card 17 is introduced into the card reader 14, the staff ID cord is indicated on the display 12, and staff leaving data is transferred to the controller 19.

The staffs can hang their personal clothes and work wear in the aperture 5*c* behind the outside door of the front cabinet 5, and store their personal affaires in the storage section 5*e*.

First, before performing haircut, the staff performs the haircut process by means of the information input terminal device 11 of the working cabinet 3.

The haircutter key 13*c* of the information input terminal device 11 is depressed to display characters "in charge of a haircut" on the display 12. Next, if the staff ID card 17 is introduced into the card reader 14, the ID cord of the staff is indicated on the display 12, and haircutter data is transferred to the controller 19.

Arrives at a shop, a customer inserts, for instance, a bill of one thousand yen into the bill inlet 22 of the payment machine 20 of the ticket vendor 18 of the reception cabinet 4. Thereupon, a ticket 24 wherein the description such as issue date, issue time, ticket number, shop number, condition for use, or the like are printed is printed and discharged from the ticket outlet 23 of the printer 21.

Ticket issuance data is created and stored in the controller 19. Besides, a congestion state code is added to the ticket issuance data, and the lighting state of the signal device changes in color, with green, yellow or red, according to the congestion state.

The staff calls up waiting customers in turn, receives the ticket 24 from the customer, and performs the start-a-haircut process by means of the information input terminal device 11 before performing haircut.

The start-a-haircut key 13*d* of the information input terminal device 11 is depressed to enable customer information input, and numeric keys 13*i* are depressed to input the ticket number, customer's sex, age and visit category in the display 12. Concerning sex, "1" is for male, "2" for female, concerning age, "0" is for under teens, "1" for teens, "2" for twenties, "3" for thirties, "4" for forties, "5" for fifties, "6" for sixties or over, and so on. Besides, as for visit category, "1" represents newcomer, and "2" for coming over again.

When confirmation key 13*e* is depressed, start-a-haircut data is transferred to the controller 19. Besides, the congestion state code is added to the start-a-haircut data, and the lighting state of the signal device changes in color with green, yellow or red, according to the congestion state. Further, the breaker 16 of the air cleaning device 9 is set in ON state.

After having cut the hair of the customer, or during haircut, the staff turns on the air cleaning device 9, rotates the hanging section 9*f* of the air hose 9*b*, operates sucking cut hair (waste hair) in the hair of the customer's head with the suction inlet 9*c*, opens the opening and shutting plate 8*a* of the dust box 8 after haircut, sweeps cut hair, dust or the like and collects in the dust box 8.

When the opening and shutting plate 8*a* of the dust box 8 is opened, the opening/closing switch 8*b* is put in ON state, and end-a-haircut data is transferred to the controller 19. Besides, the congestion state code is added to the end-a-haircut data, and the lighting state of the signal device changes in color with green, yellow or red, according to the congestion state. Further, the breaker 16 of the air cleaning device 9 is put in OFF state.

The operation and processing procedures in a shop are as described above, various data created in respective processing is stored in the controller 19, and if there is a business consignment organ, it is transferred to the Web server device and data base server device by data transfer command from the business consignment organ.

In such system, as the respective shop, the business consignment organ, the management head office, the financial institutions, the owners and the staffs are connected by communication network to transmit or receive various information, the management head office can collect sales information, staff information, customer information of the respective shop or the like securely and rapidly, in a way to reduce considerably labor and time for managing the respective shop.

In addition, as sales information, staff information, customer information of respective shop or the like can be collected securely and rapidly, measures to increase sales of respective shop and improve the service can be established easily by analyzing such information.

The owner as well can inquire easily about sales situation and expect the sure investment, while the staff can inquire easily about their haircut results and service record, and expect a just evaluation.

As mentioned above, according to the present invention, the haircut staff can proceed and manage the haircut work effectively, all the way inputting necessary information through the terminal device.

As cabinets can be arranged so as to surround the haircut chair with the front and the side, eyes meet seldom among adjacent haircut chairs, so as to relieve the customer having haircut, and the haircutter can work easily.

The combination with the controller of the reception cabinet or others, the haircut work can be managed and promoted more rationally. The customer also can transmit information to the haircutter, and can visit the shop easily.

The disposition of dust box makes cleaning simple, and the coordination of dust box opening/closing with the information input terminal device can make the haircut information management further more efficient.

What is claimed is:

1. A working cabinet for barber and beauty shops, composed by continuously installing a front cabinet and a side cabinet as a pair with a certain angle, providing a mirror on a face of the front cabinet, and disposing an information input terminal device in either cabinet, and a controller connected to said input terminal device, said controller being operative to detect and process information related to sales and current activities at said working cabinet and to output information related to said sales and current activity.

2. A working cabinet for barber and beauty shops according to claim 1, wherein the information input terminal device includes a card reader for reading a card containing customer information and staff information and converting the customer information and staff information to electronic form for access by said controller.

3. A working cabinet for barber and beauty shops according to claim 1, wherein a flat dust box is arranged in front of the front cabinet, and a haircut chair is disposed on the dust box.

4. An arrangement of working cabinets for barber and beauty shops, composed by arranging continuously a plurality of front cabinets and side cabinets by pairing of a front cabinet and a side cabinet having a certain angle between each other, providing a mirror on a face of each front cabinet, and disposing respectively an information input terminal device in each pair of cabinets, further comprising a controller connected to all of said input terminal devices said controller being operative to detect and process information related to sales and current activities at each said working cabinet separately and all said working cabinets together, and to output information related to said sales and current activity.

5. A working cabinet for barber and beauty shops according to claim 4, wherein the information input terminal device includes a card reader for reading a card containing customer information and staff information and converting the customer information and staff information to electronic form for access by said controller.

6. A working cabinet for barber and beauty shops according to any one of claims 1, 4, 2 and 5, wherein a dust box is composed by forming an opening and shutting plate on a side of the dust box, an opening/closing switch detecting open/closed state of the opening and shutting plate is attached to the opening and shutting plate and connected to a computer with the information input terminal device.

* * * * *